United States Patent
Chini et al.

(10) Patent No.: US 6,974,122 B2
(45) Date of Patent: Dec. 13, 2005

(54) GATES FOR THROTTLE VALVES

(75) Inventors: Fabrizio Chini, Rovereto (IT); Renzo Moschini, Bologna (IT); Emanuela Pieri, Bologna (IT)

(73) Assignee: Magneti Marelli Powertrain S.p.A., Turin (IT)

( * ) Notice: Subject to any disclaimer, the term of this patent is extended or adjusted under 35 U.S.C. 154(b) by 174 days.

(21) Appl. No.: 10/439,293

(22) Filed: May 16, 2003

(65) Prior Publication Data

US 2004/0011988 A1 Jan. 22, 2004

(30) Foreign Application Priority Data

May 17, 2002 (IT) ........................... BO2002A0303

(51) Int. Cl.⁷ ................................................ F16K 1/16
(52) U.S. Cl. ...................... 251/300; 251/302; 251/368; 137/527
(58) Field of Search ................................ 251/298, 301, 251/302, 353, 368; 137/527, 527.8, 843

(56) References Cited

U.S. PATENT DOCUMENTS

| 4,512,720 A | 4/1985 | Cholakis |
| 4,774,977 A * | 10/1988 | Cohen ........................ 137/271 |
| 6,334,615 B1 | 1/2002 | Uchiyama et al. |

FOREIGN PATENT DOCUMENTS

| DE | 43 29 526 A1 | 3/1995 |
| DE | 44 23 370 A1 | 1/1996 |
| DE | 195 16 927 A1 | 11/1996 |
| DE | 198 48 440 A1 | 4/2000 |
| EP | 0 560 221 A1 | 9/1993 |
| EP | 0 983 885 A2 | 3/2000 |
| FR | 2 550 848 | 2/1985 |

OTHER PUBLICATIONS

Mills et al., "Materials of Construction", 1955, John Wiley & Sons, INC., Sixth Edition, p. 551.*
Abstract, XP002221307; Database WPI Section Ch, Week 199107, Derwent Publications Ltd., London, GB; Class A32, AN 1991-048767.
Patent Abstracts of Japan; 11311344; dated Sep. 11, 1999.
English Abstract of FR2550848 published Feb. 22, 1985.
English Abstract of DE4423370 dated Jan. 11, 1996.
English Abstract of DE 19516927 dated Nov. 14, 1996.
"Drosselklappen in Serie Kunststoff-Drosselklappen Im Ansaugmodul Sind Moglich" by Kuststoffe, Carl Hanser Verlag, Munchen, DE, vol. 85, No. 3, Mar. 1, 1995; pp. 308-310.
English Abstract of DE19848440, dated Apr. 27, 2000.
English Abstract of EP0560221B1, dated Sep. 15, 1993.
European Search Report 03011258.5-1253.

* cited by examiner

Primary Examiner—Edward K. Look
Assistant Examiner—John K Fristoe, Jr.
(74) Attorney, Agent, or Firm—Arent Fox PLLC

(57) ABSTRACT

Gate for throttle valves composed of a central supporting portion constituted by a thermoplastic material and an edge portion constituted by a thermoplastic elastomeric material belonging to the same chemical family as the thermoplastic material; the gate is produced by means of a coinjection process of the thermoplastic material and the thermoplastic elastomeric material.

3 Claims, 1 Drawing Sheet

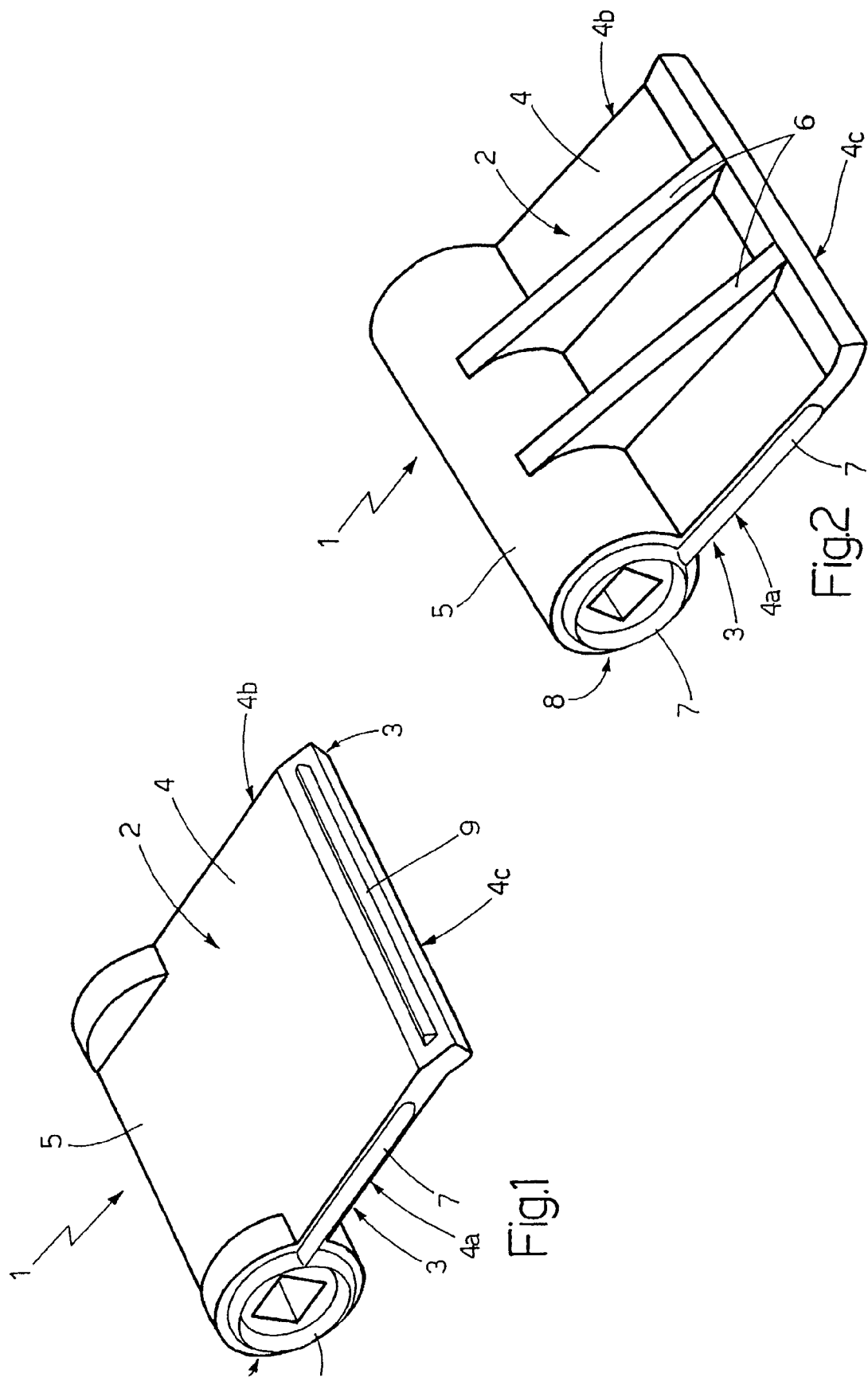

GATES FOR THROTTLE VALVES

The present invention relates to novel gates for throttle valves.

In particular, the present invention relates to novel gates for throttle valves for automotive use without consequently restricting the general scope thereof.

BACKGROUND OF THE INVENTION

In known throttle valves, the gates are bodies that can move between a closed position and a maximally open position of a pipe for selective control of the flow rate of fluid through said pipe.

It is obvious from the above that the effectiveness of the gate is directly dependent upon the adhesion achieved between the edge portion of the gate itself and the pipe walls. In order to achieve effective adhesion between the pipe walls and the edge of the gate, the edge of the gate must itself be constituted by a material that is capable of compensating for the dimensional errors and variations that arise over the service temperature range of the gates.

Gates produced from metallic material and machined by specific processes that permit elevated dimensional precision are known. Such a solution has the disadvantage of being particularly costly and, over time, of not having the required levels of effectiveness.

Another known solution provides for the production of a gate constituted by a central supporting portion produced from thermoplastic material and an edge portion produced from thermoplastic elastomeric material and connected to the central body in purely mechanical manner. Such a solution comprises both the disadvantage relating to the geometric constraints imposed by the mechanical connection and the disadvantage relating to the progressive detachment that, as time passes, occurs between the central supporting portion of thermoplastic material and the edge portion of thermoplastic elastomeric material.

SUMMARY OF THE INVENTION

The aim of the present invention is to provide novel gates for throttle valves that are capable of overcoming the problems of the prior art in a simple and economic manner.

The subject-matter of the present invention is a gate comprising a central supporting portion constituted by thermoplastic material and at least one edge portion constituted by thermoplastic elastomeric material; said gate being characterised in that said thermoplastic material and said thermoplastic elastomeric material are polymeric materials belonging to the same chemical family.

The gate according to the present invention is preferably produced by means of coinjection of said thermoplastic material and said thermoplastic elastomeric material.

The thermoplastic material and the thermoplastic elastomeric material preferably belong to one of the polymer families included in the group constituted by polyesters, polyamides and polyolefins.

The thermoplastic material and the thermoplastic elastomeric material preferably belong to the family of polyesters.

BRIEF DESCRIPTION OF THE DRAWINGS

The purpose of the following illustrative and non-limiting example is to provide a better understanding of the invention with reference to the attached figures, in which:

FIG. 1 is a perspective view from above of a preferred embodiment of the gate provided by the present invention; and FIG. 2 is a perspective view from below of the gate of FIG. 1.

DETAILED DESCRIPTION OF THE INVENTION

In FIGS. 1 and 2, 1 denotes overall a gate comprising a central supporting portion 2 constituted by thermoplastic material and a peripheral edge portion 3 constituted by thermoplastic elastomeric material.

The central supporting portion 2 comprises a substantially rectangular shaped sealing portion 4, a cylindrical hinge portion 5 arranged at one of the sides of the sealing portion 4 and a pair of substantially triangular-shaped reinforcing ribs 6 that extend from the cylindrical hinge portion 5 to the sealing portion 4.

The peripheral edge portion 3 comprises a lateral portion 7 that extends laterally from the lateral edges 4a and 4b of the sealing portion 4 and from the circular bases 8 of the cylindrical hinge portion 5 and an upper portion 9 (visible only in FIG. 1) that extends along an edge 4c of the sealing portion 4 that is opposite the side occupied by the cylindrical hinge portion 5.

In the particular embodiment illustrated, the thermoplastic material is a polyester designated PBT GF 30 (in particular Pibiter NRV30 black 900) and the thermoplastic elastomeric material is a polyester designated HYFLEX VH85A2611 natural.

The gate of the present invention is produced by the coinjection method, which substantially consists in moulding two different materials in succession. In particular, the material having a lower melting point is moulded first and then, but before said material cools, the material having a higher melting point is moulded.

In service, the gate of the particular embodiment described above is used in a pipe of rectangular section (known and, for the sake of simplicity, not illustrated) in which it is hinged along the cylindrical hinge portion 5 and moves between the closed position and a maximally open position of said pipe in order to produce selective control of the flow rate of a fluid. During the movement of the gate 1, the peripheral edge portion 3 constituted by the thermoplastic elastomeric material is in sliding contact with the pipe walls, in such a manner as to achieve constant controlled and effective variation of the fluid within the pipe.

The present invention makes it possible to produce gates that have low production costs and that simultaneously provide an elevated and durable level of effectiveness. In fact, as stated above, the presence of the elastomeric material on the edge of the gate ensures effective adhesion of the gate to the gate walls. Moreover, the chemical compatibility (belonging to the same family) of the thermoplastic material and the thermoplastic elastomeric material on the one hand ensures perfect adhesion of the two materials without the assistance of adhesives and, on the other, prevents different coefficients of thermal expansion, differing thermal behaviour and mechanical stresses from bringing about the loss of adhesion typical of mechanical connection systems.

Finally, it is obvious that modifications and variants can be made to the throttle valve gate provided by the invention if they do not extend beyond the scope of the claims.

In particular, the gates of the present invention can comprise a sealing portion that is of circular instead of rectangular shape and is hinged to the pipe along its own diameter. In this type of gate, the peripheral portion constituted by the thermoplastic elastomeric material extends radially from the edge of the sealing portion.

What is claimed is:

1. Gate (1) for throttle valves comprising a central supporting portion (2) constituted by a thermoplastic material and at least one peripheral edge portion (3) constituted by a thermoplastic elastomeric material; said gate being characterised in that said thermoplastic material and said thermoplastic elastomeric material are polymeric materials belonging to the same chemical family, said chemical family being polyesters.

2. Gate according to claim 1, characterized in that it is produced by coinjection of said thermoplastic material with said thermoplastic elastomeric material.

3. Gate for throttle valves according to claim 1, characterised in that said supporting portion (2) comprises hinge means (5) and in that said peripheral portion (3) extends laterally from the edges (4a, 4b, 4c) of said supporting portion (2).

* * * * *